United States Patent
Kalama et al.

(10) Patent No.: US 9,213,935 B2
(45) Date of Patent: Dec. 15, 2015

(54) ROLE-PLAY SIMULATION ENGINE

(75) Inventors: Asa K. Kalama, South Pasadena, CA (US); Cory J. Rouse, Encino, CA (US); Michael Ilardi, Los Angeles, CA (US); Reid Swanson, Santa Cruz, CA (US)

(73) Assignee: Disney Enterprises, Inc., Burbank, CA (US)

( * ) Notice: Subject to any disclaimer, the term of this patent is extended or adjusted under 35 U.S.C. 154(b) by 709 days.

(21) Appl. No.: 13/229,551

(22) Filed: Sep. 9, 2011

(65) Prior Publication Data

US 2013/0066608 A1 Mar. 14, 2013

(51) Int. Cl.
*G06G 7/48* (2006.01)
*G06N 3/00* (2006.01)
*A63J 7/00* (2006.01)
*A63F 13/30* (2014.01)
*G06Q 10/00* (2012.01)

(52) U.S. Cl.
CPC ............... *G06N 3/006* (2013.01); *A63F 13/12* (2013.01); *A63J 7/00* (2013.01); *G06Q 10/00* (2013.01); *A63F 2300/302* (2013.01); *A63F 2300/406* (2013.01); *A63F 2300/5593* (2013.01); *A63F 2300/807* (2013.01); *A63F 2300/8094* (2013.01)

(58) Field of Classification Search
CPC ........... G06Q 10/00; A63J 7/00; A63F 13/12; A63F 2300/8094; A63F 2300/406; A63F 2300/5593; A63F 2300/807; A63F 2300/302; G06N 3/006
USPC ..................................... 703/6; 726/4; 345/633
See application file for complete search history.

(56) References Cited

U.S. PATENT DOCUMENTS

| | | | | |
|---|---|---|---|---|
| 6,321,158 | B1* | 11/2001 | DeLorme et al. | 701/426 |
| 7,584,048 | B2* | 9/2009 | Pham et al. | 701/434 |
| 2002/0080198 | A1* | 6/2002 | Giraldin et al. | 345/864 |
| 2002/0111215 | A1 | 8/2002 | Wah Chan | |
| 2010/0306825 | A1* | 12/2010 | Spivack | 726/4 |
| 2011/0319148 | A1* | 12/2011 | Kinnebrew et al. | 463/1 |
| 2012/0162255 | A1* | 6/2012 | Ganapathy | H04L 67/38 345/633 |

FOREIGN PATENT DOCUMENTS

| GB | 2392331 A | * | 2/2004 |
|---|---|---|---|
| HK | 1039253 A | | 3/2002 |

OTHER PUBLICATIONS

Ken Lynch, RFID Lets Theme Parks Be Fun for All, Nov. 10, 2010, (URL: http://rfid.thingmagic.com/rfid-blog/bid/50518/RFID-Lets-Theme-Parks-Be-Fun-for-All).

Keep Track of Children in Amusement Parks, Feb. 22 2011, (URL: http://www.essortment.com/keep-track-children-amusement-parks-31067.html).

(Continued)

*Primary Examiner* — Eunhee Kim
(74) *Attorney, Agent, or Firm* — Patent Ingenuity, P.C.; Samuel K. Simpson

(57) ABSTRACT

A coordination processor receives data from a simulated role-play environment having a performer that is assigned a role. Further, the coordination processor composes an instruction to the performer to perform an action in the simulated role-play environment. The instruction is selected to implement a narrative possibility in a role-playing simulation. In addition, the instruction is sent to an interface that provides the instruction to the performer in the simulated role-play environment.

33 Claims, 10 Drawing Sheets

(56) References Cited

OTHER PUBLICATIONS

Theme Park Technology: KidSpotter Rolls Out the Spotter to Theme Parks, May 9, 2011, (URL: http://www.blooloop.com/news/theme-park-technology-kidspotter-rolls-outthe-sp/2543).

Christopher Boyd, High-tech security systems expand at theme parks, Jun. 6, 2006, (URL: http://articles.orlandosentinel.com/2006-0606/business/THEMEPARK06_1_theme-parks-security-visitors).

Theme Parks Canuck, 5 Official theme Park Apps to enhance your trip, (URL: http://themeparkcanuck.com/2011/10/19/5-official-theme-park-apps-toenhance-your-trip/).

Kidoctr's Progress Notes (Magi Quest), Jul. 11, 2008, http://kidoctr.blogspot.com/2008/07/magiquest.html.

Keep Track of Children in Amusement Parks, Feb. 22, 2011, (URL: http://www.essortment.com/keep-track-children-amusement-parks-31067.html).† iSky GPS, Feb. 2, 2011, (URL: http://iskygps.com).†

Theme Park Technology: KidSpotter Rolls Out the Spotter to Theme Parks, May 9 2011, (URL: http://www.blooloop.com/news/theme-park-technology-kidspotter-rolls-outthe-sp/2543).†

James D Neely, Theme Parks Meet GPS Tracking Systems, May 23, 2009, (URL: http://EzineArticles.com/2385149).†

Violet Jones, Latest Amusement Park Mass Conditioning Exercise: Tracking Systems forYour Family, Jul. 27, 2004, (URL: http://www.infowars.com/print/bb/amusement_park_tracker.htm).†

Christopher Boyd, High-tech security systems expand at theme parks, Jun. 6 2006, (URL: http://articles.orlandosentinel.com/2006-0606/business/THEMEPARK06_1_theme-parks-security-visitors).†

\* cited by examiner
† cited by third party

ROLE-PLAY SIMULATION ENGINE

BACKGROUND

1. Field

This disclosure generally relates to the field of simulation. More particularly, the disclosure relates to role-play simulation.

2. General Background

A long-form role-play experience is a simulation of an experience in which participants are assigned particular roles in the simulation. As an example, an amusement park may provide a long-form role-play experience that includes performers interacting with guests throughout different geographical locations in the amusement park. As an example, a performer may be an actor. The performers may act out particular actions and lines, and the participants have the opportunity to be active within the role-play experience rather than passive audience members. Other types of performers that do not act may also be utilized in a role-play environment. For example, an amusement park guest may have the opportunity to dress up in a costume and take on the role of a character such as a protagonist in a narrative. Many amusement park guests have exhibited satisfaction with the long-form role-play experience.

However, large scale implementation of long-form role-play experiences has provided a difficult operational challenge. For instance, a large number of performers have to be utilized to act out a typical narrative. Further, coordination of moving performers to different locations to play out different scenes involves numerous additional people and resources. As a result, current long-form role-play experiences are too costly to be provided on a large scale. Accordingly, current long-form role-play experiences are typically provided as a premium experience to a limited number of guests at an amusement park.

The example of an amusement park is provided only as an example. Long-form role-play experiences may be provided in a variety of other geographic locations and contexts other than amusement parks. The large scale implementation of a long-form role-play experience is a difficult operational challenge irrespective of the location and the context.

SUMMARY

In one aspect of the disclosure, a system includes a coordination processor that receives data from a simulated role-play environment and composes an instruction to a performer to perform an action in the simulated role-play environment. Further, the system includes an interface that receives the instruction from the coordination processor and provides the instruction to the performer.

In another aspect of the disclosure, a computer program product is provided. The computer program product includes a computer useable medium having a computer readable program. The computer readable program when executed on a computer causes the computer to receive data from a simulated role-play environment. Further, the computer readable program when executed on the computer causes the computer to compose an instruction to a performer to perform an action in the simulated role-play environment. In addition, the computer readable program when executed on the computer causes the computer to send the instruction to an interface that provides the instruction to the performer.

In yet another aspect of the disclosure, a process is provided. The process receives, at a coordination processor, data from a simulated role-play environment. Further, the process composes, at the coordination processor, an instruction to a performer to perform an action in the simulated role-play environment. In addition, the process sends the instruction to an interface that provides the instruction to the performer.

In another aspect of the disclosure, a system is provided. The system includes a coordination processor that receives data from a simulated role-play environment and composes an instruction to a computing device to perform an action in the simulated role-play environment. Further, the system includes an interface that receives the instruction from the coordination processor and provides the instruction to the computing device.

BRIEF DESCRIPTION OF THE DRAWINGS

The above-mentioned features of the present disclosure will become more apparent with reference to the following description taken in conjunction with the accompanying drawings wherein like reference numerals denote like elements and in which:

FIG. 3A illustrates a first GUI that allows a performer to view the methods received from the planner/scheduler.

FIG. 3B illustrates a second GUI in which a performer may view the interactions from the interactions log.

FIG. 3C illustrates a third GUI in which a performer may view a map.

FIG. 3D illustrates a fourth GUI in which profiles of the guests may be viewed.

FIG. 3E illustrates that guests details may be revealed if the performer selects a particular guest photograph from FIG. 3D.

DETAILED DESCRIPTION

A role-play simulation engine coordinates real world inputs from a role-play environment with a storyline of a narrative. As an example, a coordination processor may be an artificial intelligence ("AI") director that coordinates a role-play simulation. Various sensors and data are provided to the coordination processor. Based on these inputs, the coordination processor may direct, props, performers, locations, and/ or the like to ensure that the participants, e.g., guests, are having a compelling and player-appropriate narrative experience. In one embodiment, the coordination processor monitors the participants to determine the status of their experiences. If the coordination processor determines based upon such monitoring that the experiences of the participants may be improved, the coordination processor may adapt the storyline, adapt instructions provided to the performers, change locations, or the like.

Figure 1:
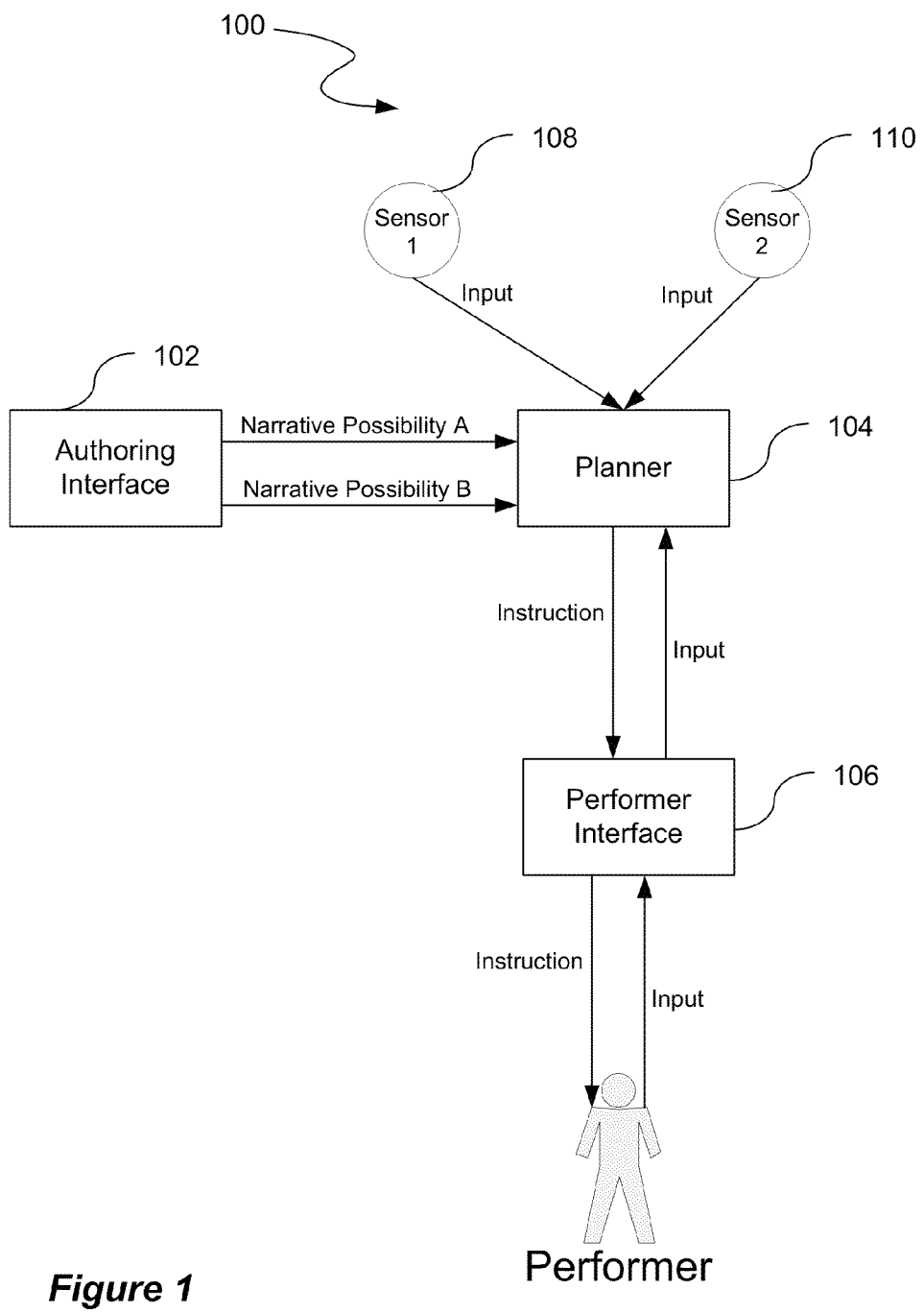
FIG. 1 illustrates a role-play simulation system.

FIG. 1 illustrates a role-play simulation system 100. The role-play simulation system 100 includes an authoring interface 102, a planner 104, a performer interface 106 and a plurality of sensors such as a first sensor 108 and a second sensor 110. The authoring interface 102 allows a writer to encode a space of narrative possibilities in a formal language.

For example, a writer may author content at a high level by defining various terminologies. For instance, the author may define the verb "to walk" and further define all of the various pre and post conditions for that verb as well as its effect. As a result, an author may define various narrative possibilities such as, for example, a first narrative possibility of a protagonist walking down the street and continuing to do so until reaching a destination, a second narrative possibility of the protagonist walking down the street and making a turn upon seeing a monster, etc. The various encoded narrative possibilities are provided to the planner 104, which interprets the encoded narrative possibilities according to the formal language. The formal language may be a programming language, syntax, or the like. In one embodiment, the planner 104 is an artificial intelligence apparatus that reasons about the narrative relative to various inputs provided by the performer interface 106 and sensors such as the first sensor 108 and the second sensor 110. The performer interface 106 allows a performer to encode world state updates in a formal structure that is parsable by the planner 104. Such world state updates are inputs provided by the performers. In the example above, the monster may be a performer dressed up in a monster costumer. The performer may go into the street in front of the protagonist and watch the protagonist make a turn. Accordingly, the performer may provide an input through the performer interface 106 to the planner 104 that indicates that the protagonist made a turn. In one embodiment the performer interface 106 is executed on a portable device that the performer carries. For example, the portable device may be a smart phone, tablet device, personal digital assistant ("PDA"), or the like. In one embodiment, the performer interface 106 provides a GUI in which the user can send inputs to the planner 104. Further, the plurality of sensors may provide inputs to the planner 104 in addition to or in the alternative to the input provided by the performer interface 106 to the planner 104. The sensors may include tracking devices such as Global Positioning System ("GPS") devices, monitoring devices such as cameras and microphones, biometric devices, or the like. The sensors may also include data sourced externally such as data from the Internet, e.g., weather, and/or location specific data, e.g., wait information, parade information, automobile traffic information, pedestrian traffic information, etc.

The inputs received from the performers and the plurality of sensors provide a variety of useful data to the planner 104. In particular, such inputs provide the planner 104 with indications of the status of the participants, which may help the planner 104 ensure and improve the overall experience of the participants. For example, if the inputs indicate that a participant is elderly, the planner 104 may adjust the narrative to ensure that the monster in the example provided above walks at a slow pace rather than at a fast pace toward the participant. Further, the inputs may provide an indication of conditions in the role-play simulation environment. For example, the plurality of sensors may include thermometers and other environmental indicators that indicate that the temperature outside in the theme park is too hot for the average participant. Accordingly, the planner 104 may adjust the narrative such that the narrative is moved inside to an air-conditioned area such that the participants may more comfortably enjoy the role-play simulation.

The planner 104 processes the inputs that it receives and generates instructions to the performers based on those inputs. In the example provided above, the planner 104 may provide an instruction to the performer that is a monster to walk at a slow pace rather than a fast pace based upon the input that the protagonist is elderly. Accordingly, a loop may be utilized between the planner 104 and the performer interface 106 such that the planner 104 provides instructions to the performer through the performer interface 106 and receives inputs from the performer through the performer interface 106 based on those instructions. The planner 104 may then send new instructions based on the input from the performer. For example, the planner 104 may send an instruction to the monster to step in front of the protagonist, the monster may provide an update to the planner 104 that the protagonist made a turn, and the planner 104 may send an instruction to the monster to follow the protagonist.

In one embodiment, the two-way interaction occurs between the planner 104 and the performers such that interaction does not occur between the participants and the planner 104. The participants may knowingly or unknowingly provide input to the planner 104, but do not receive data from the planner 104. As an example, a protagonist may carry a prop with a GPS device or may have a GPS device positioned on himself or herself that provides the planner 104 with the location of the protagonist.

In one embodiment, the authoring interface 102 is optional. For example, the narrative possibilities may be pre-generated, manually entered, etc.

Figure 2:
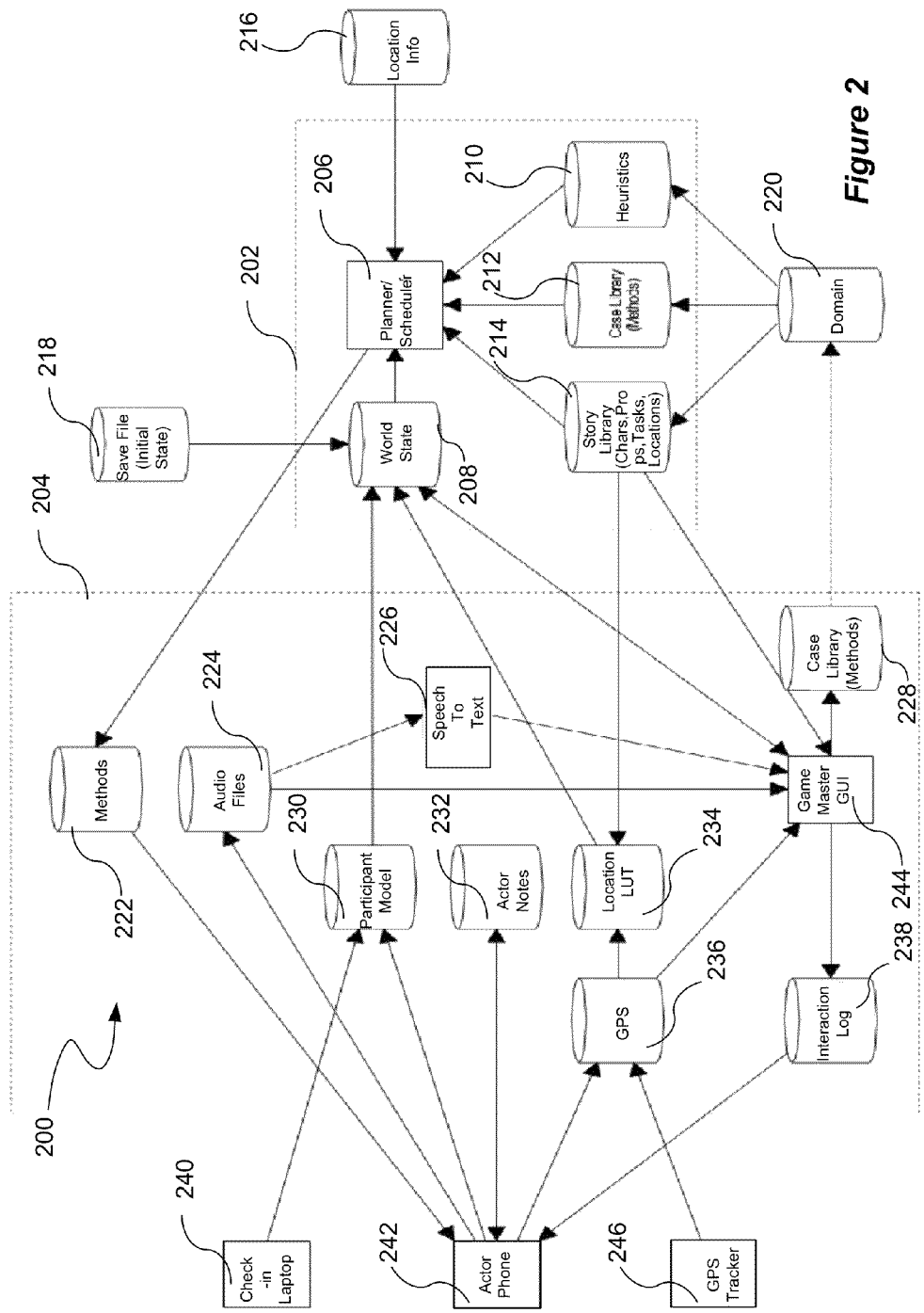
FIG. 2 illustrates a system configuration of role-play simulation environment.

FIG. 2 illustrates a system configuration 200 of role-play simulation environment. The system configuration 200 includes a coordination component 202 and a game master interface 204. The coordination component 202 is an example of an implementation of the planner 104 illustrated in FIG. 1. The coordination component 202 may include a planner/scheduler 206 that implements artificial intelligence routines to coordinate the narrative. The planner/scheduler 206 receives various inputs from a world state database 208. In other words, the world state database 208 stores data received from sensors, performers, or the like. The world state database 208 may receive an initial state from a save file database 218. In other words, the role play simulation environment will have an initial set of conditions. Further, the planner/scheduler 206 receives data from a park info database 216 that may or may not be external to the coordination component 202. The park info database 216 provides an indication of various role play simulation environment conditions. For example, the location info database 216 may have data such as location construction areas, location detours, location crowd information, location temperature information, location weather information, or the like. An example of a location is a theme park. The coordination component also includes a story library 214 that includes various narrative data such as character data, prop data, task data, and location data. The planner/scheduler 206 utilizes this narrative data to coordinate the narrative. Further, the coordination component includes a case library 212 that includes various methods, functions, routines, or the like that have been previously utilized by the planner/scheduler 206 to provide instructions to the performers. In other words, the coordination component 202 maintains a database of instructions previously utilized as previously utilized instructions may be helpful as future instructions to performers. In addition, the coordination component includes a heuristics database 210 that includes various heuristics that enable the planner/scheduler 206 to learn from pervious actions. As an example, the heuristics database 210 may indicate that an instruction to a performer to follow the protagonist in hot weather lead to an unsatisfactory experience. The planner/scheduler 206 then may utilize artificial intelligence routines to determine a future instruction that would instruct the performer to not follow the protagonist if the weather conditions are too hot. The planner/scheduler 206 may be implemented with a coordination processor.

The game master interface 204 allows a user to view the interactions between coordination component 202 and the performers. The game master interface 204 includes a methods database 222 that stores the methods generated by the planner/scheduler 206. The game master interface 204 then provides those methods to a performer through a device such as a performer phone 242 so that the performer receives instructions about what actions to perform or not perform. In one embodiment, the transmission of the methods from the planner/scheduler 206 to the methods database 222 to the performer phone 242 is automatic without any additional manual interaction. Alternatively, a user viewing the game master interface 204 may be able to control what methods are sent or not sent to the performer at the performer phone 242. As yet another alternative, a user viewing the game master interface 204 may provide methods to the performer phone 242 by adding methods manually to the methods database 222 or manually inputting methods and transmitting those methods to the performer phone 242.

In one embodiment, the game master interface 204 may also include an audio files database 224 that stores inputs received from a performer via the performer phone via audio files. The audio files database 224 may then provide the audio files to a speech to text converter 226. The speech to text converter 226 then provides the text to a game master graphical user interface ("GUI") 244 for display to the user at the game master interface 204. The speech to text converter 226 may be a human being performing the conversion or an automated system performing the conversion. In one embodiment, the speech to text converter 226 provides the text to a formal logical language module that parses the text into a formal logical language that may be interpreted by the planner/scheduler 206. In an alternative embodiment, the actors may be trained to speak in an abbreviated formal language. In an alternative embodiment, text may be provided directly from the performer phone 242 to the game master GUI 244 via text messaging, e-mail, or the like.

In one embodiment, the game master GUI 244 also has a participant model database 230 that stores information about the participants. The participant model database 230 may obtain such information from a variety of sources. For example, participants may have to register for the role-play simulation game. The registration process may occur at a registration booth where a game employee registers the participant at a check-in laptop 240. Alternatively, the registration process may take place at the time the user purchases a ticket in person at the park, online through the Internet at the park or outside the park, or the like with or without a check-in laptop operated by a game employee. The participant model database 230 may include information such as participant photos, participant age, participant physical condition, likes, dislikes, etc. Further, the participant model database 230 may include information about the participant's previous role play simulation experiences. For example, a participant may have participated previously as a particular character and may wish to participate in another role-play experience as that same character. The participant model database 230 may also store data based on input received from the performers. For example, a performer may send information through the performer phone 242 to the participant model database 230 about a participant. For instance, the performer may observe that the participant is athletic and enjoys physical challenges. The participant model 230 may provide all or some of the participant data to the world state database 208 so that the planner/scheduler 206 may make decisions on how to proceed with the narrative based upon the participants involved.

The game master interface 204 may also have a performer notes database 232 in which performers may store notes that they make about the participants, various conditions, etc. In one embodiment, each performer has secure access to his or her particular performer notes. In yet another embodiment, all of the performers can view each other's performer notes. For example, a first performer may view what a second performer says about a participant. Based on these collaborative notes, the performers may receive information in addition to the instructions received from the planner/scheduler 206.

In one embodiment, the game master interface 204 also has a GPS database 236 that stores GPS coordinates received from a GPS tracker 246. The GPS tracker may be positioned on a participant, within a prop carried by the participant, etc. The GPS database 236 provides the GPS coordinates to a location look up table ("LUT") 234. The location LUT determines a particular geographic area based on the GPS coordinates. For example, the location LUT 234 may determine that the GPS coordinates indicate that a participant is in a warehouse in an amusement park. The location LUT 234 then provides this information to the planner/scheduler 206 so that the planner/scheduler 206 may coordinate the narrative. For example, the participant may be in the warehouse, but should be in a different location according to the narrative. The planner/scheduler 206 may then send instructions to performers to reveal themselves in the warehouse and other locations so that the participant moves to the intended location or send instructions to performers at the other location to move to the warehouse. Various other types of instructions may also be utilized. The planner/scheduler 206 may also utilize travel time based upon location when determining which instructions to provide to the actors.

Further, an interaction log 238 may be utilized to record the interactions between the planner/scheduler 206 and the performers. Accordingly, the performers may review the interaction logs to ensure that they are performing the instructions as indicated by the planner/scheduler 206.

In addition, a case library 228 may also be utilized by the game master interface 204. The case library 228 stores methods that have been sent through the game master interface 204. Such methods may include the methods received from the planner/scheduler 206 in addition to any methods manually generated by a user viewing the game master interface 204. The aggregate set of methods may be provided from the case library 228 to a domain database 220 such that the coordination component will have available to it the full set of methods generated by the planner/scheduler 206 and/or a user at the game master interface 204 for future developments in the role-play experience and/or future role-play experiences.

In another embodiment, the performer may not be a human performer. For example, the performer may be an autonomous character such as a three-dimensional ("3D") generated character. In yet another embodiment, the performer may be a robotic character. In another embodiment, a computing device rather than a performer may be utilized. For example, a guest may approach a computerized kiosk, which performs a particular action based upon an instruction received from the planner/scheduler 206. For instance, the kiosk may display a video to the guest.

Figure 3A:
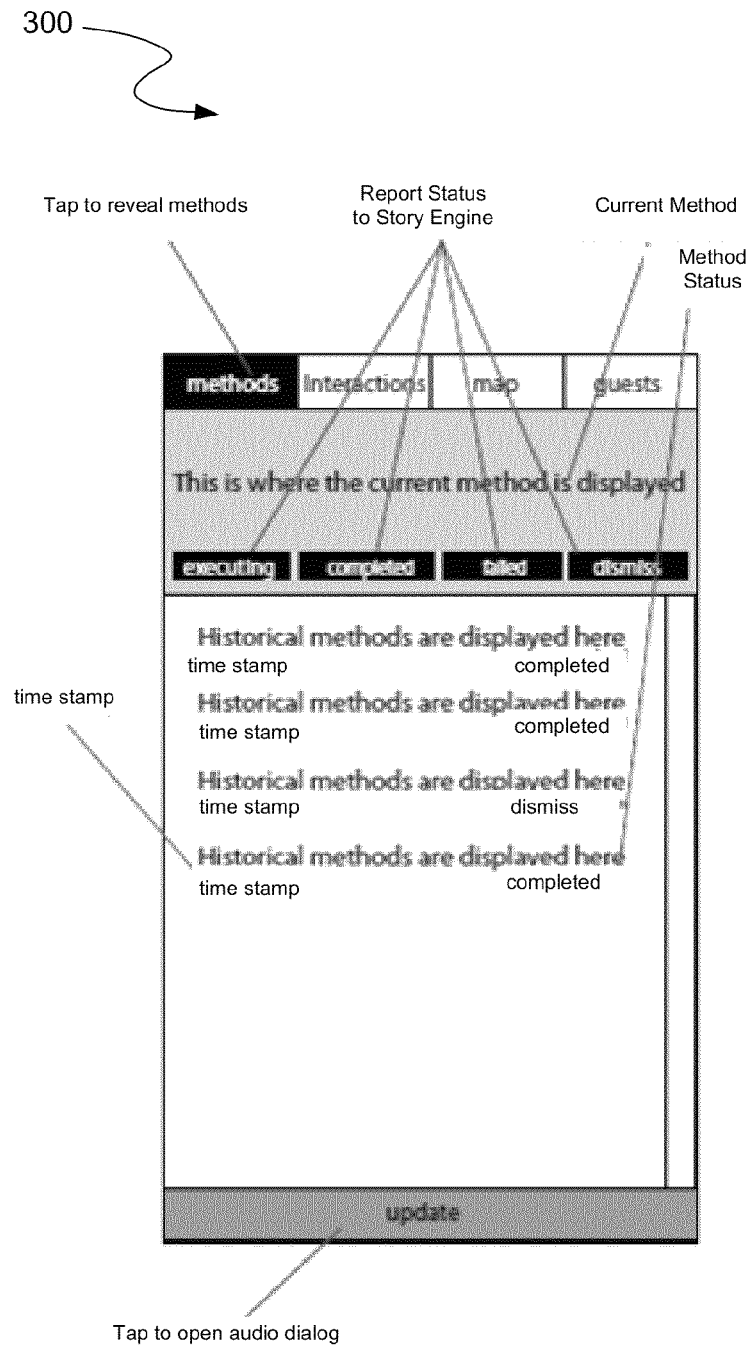
FIGS. 3A-3E illustrate examples of a graphical user interface ("GUI") for a performer device.
Figure 3B:
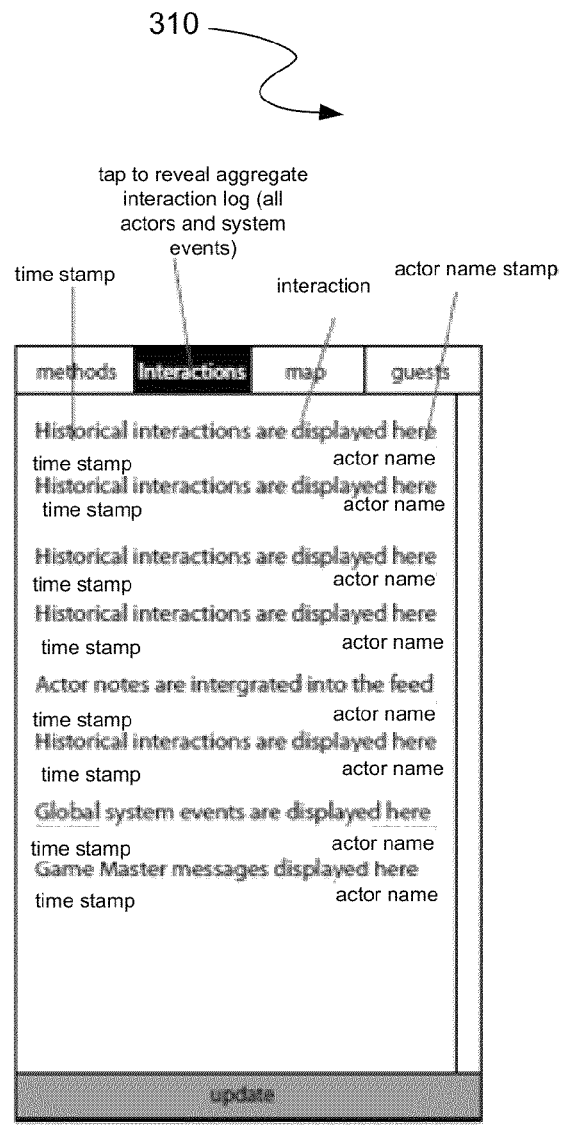
Figure 3C:
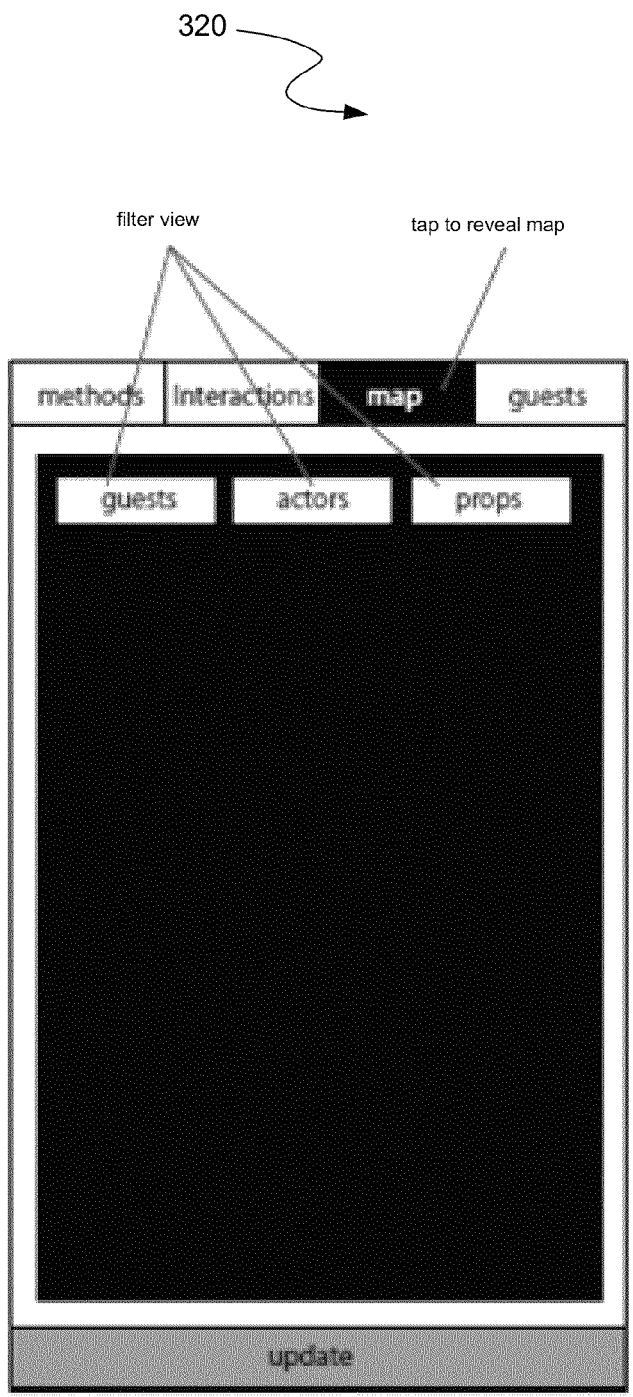
Figure 3D:
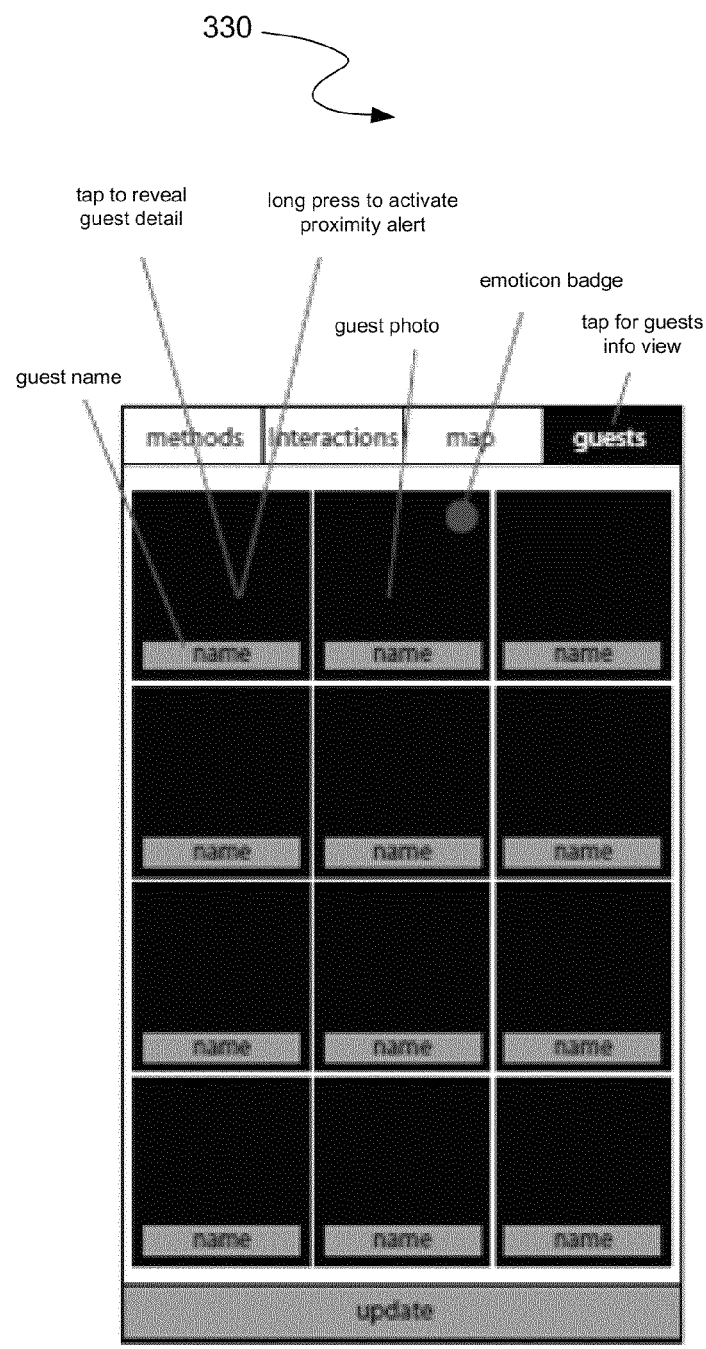
Figure 3E:
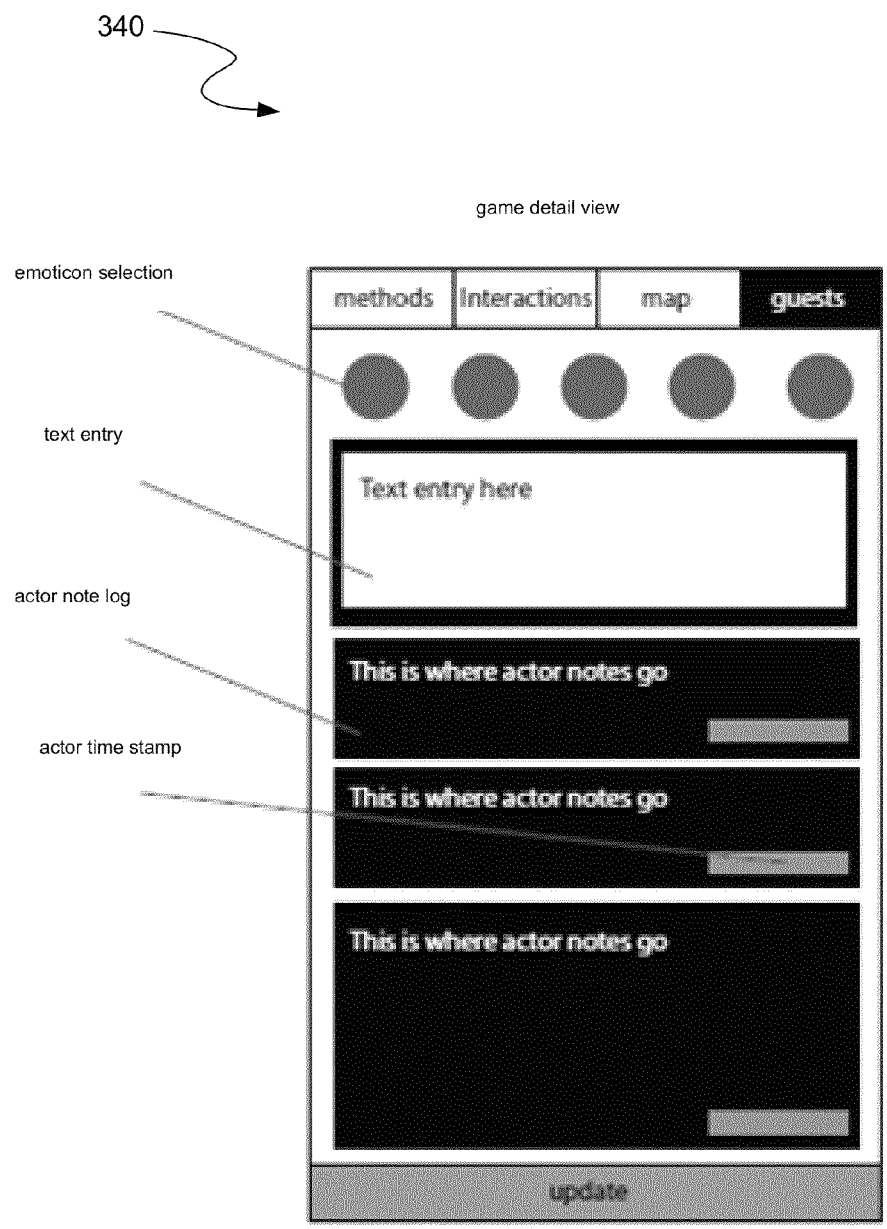

FIGS. 3A-3E illustrate examples of a GUI for a performer device. FIG. 3A illustrates a first GUI 300 that allows a performer to view the methods received from the planner/scheduler 206. In one embodiment, the performer may view the methods that are executing, been completed, failed, or dismissed. A time stamp may optionally be utilized for each of the methods. Further, FIG. 3B illustrates a second GUI 310 in which a performer may view the interactions from the interactions log 238. In one embodiment, the interactions are the aggregate interactions of all performer and system events. In addition, FIG. 3C illustrates a third GUI 320 in which a performer may view a map. The map may indicate the locations of the guests, performers, and props. The locations may be determined by the lookup LUT 234 based upon GPS coordinates determined by tracking the guests, performers, and props. FIG. 3D illustrates a fourth GUI 330 in which profiles of the guests may be viewed. For example, pictures of each guest may be arranged in a grid format. Further, FIG. 3E illustrates that guests details may be revealed if the performer selects a particular guest photograph from FIG. 3D.

The planner/scheduler 206 monitors the status of the instructions/methods that it provides to the actors. If an actor indicates that an instruction has failed, the planner/scheduler 206 may provide additional instructions to that actor and/or different actors to adjust the narrative. For example, if the planner/scheduler 206 provides an instruction to an actor enter a street and find a guest and the actor is unable to find the guest, the actor may indicate to the planner/scheduler 206 that he or she cannot find the guest. The planner/scheduler 206 may then provide an instruction to the actor to utilize an alternate street, provide an instruction to a different actor that has indicated seeing the particular guest, or the like.

Various networks may be utilized to implement the system configuration 200. For example, the Internet, GPS, wireless networks, local area networks ("LANs"), wide area networks ("WANs"), telecommunications networks, and/or the like may be utilized.

Figure 4:
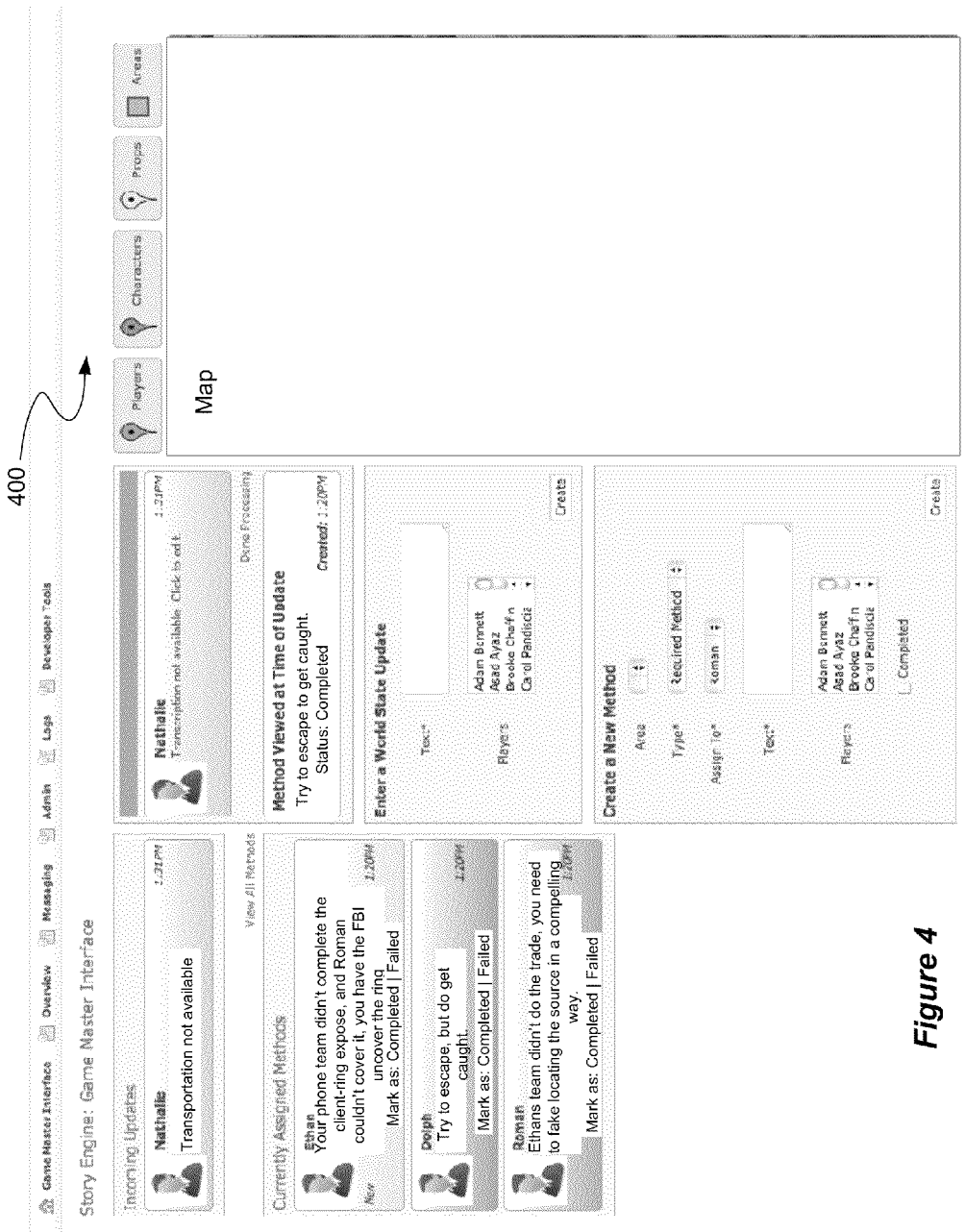
FIG. 4 illustrates an example of the game master interface GUI illustrated in FIG. 2.

FIG. 4 illustrates an example of the game master interface GUI 244 illustrated in FIG. 2. The game master interface GUI 244 may include an overall view of updates from performers and methods that have been assigned to different players. Further, the game master interface GUI 244 may allow a user to manually enter a world status update or manually create a new method. Further, the map allows the user to view the locations of the players, characters, props, and/or areas. Various indicia may be utilized to symbolize players, characters, props, and/or areas and their respective locations on the map. The map may show various perspectives such as satellite view, street view, or the like.

Figure 5:
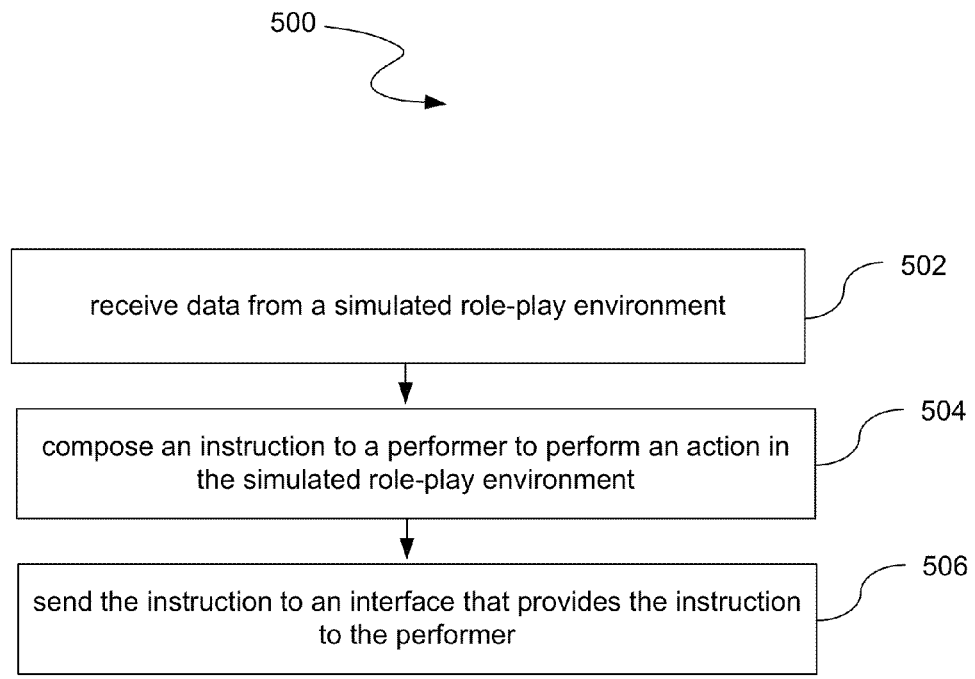
FIG. 5 illustrates a process that is utilized to provide a role-play simulation experience.

FIG. 5 illustrates a process 500 that is utilized to provide a role-play simulation experience. At a process block 502, the process 500 receives, at a coordination processor, data from a simulated role-play environment. Further, at a process block 504, the process 500 composes, at the coordination processor, an instruction to a performer to perform an action in the simulated role-play environment. In addition, at a process block 506, the process 500 sends the instruction to an interface that provides the instruction to the performer.

The processes described herein may be implemented in a general, multi-purpose or single purpose processor. Such a processor will execute instructions, either at the assembly, compiled or machine-level, to perform the processes. Those instructions can be written by one of ordinary skill in the art following the description of the figures corresponding to the processes and stored or transmitted on a computer readable medium. The instructions may also be created using source code or any other known computer-aided design tool. A computer readable medium may be any medium capable of carrying those instructions and include a CD-ROM, DVD, magnetic or other optical disc, tape, silicon memory (e.g., removable, non-removable, volatile or non-volatile), packetized or non-packetized data through wireline or wireless transmissions locally or remotely through a network. A computer is herein intended to include any device that has a general, multi-purpose or single purpose processor as described above. For example, a computer may be a personal computer ("PC"), laptop, smartphone, tablet device, set top box, or the like.

Figure 6:
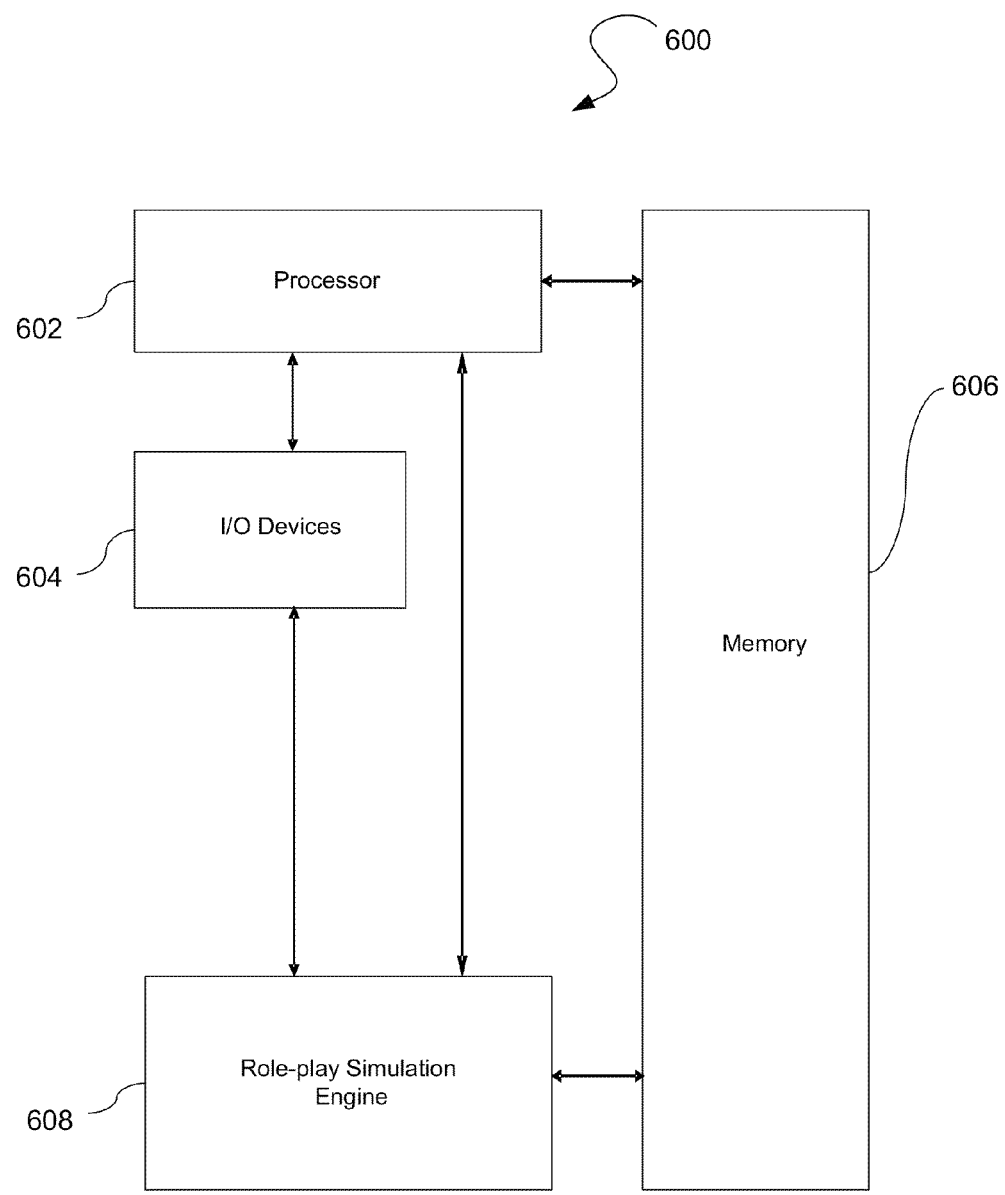
FIG. 6 illustrates a block diagram of a station or system that provides role-play simulation experience.

FIG. 6 illustrates a block diagram of a station or system 600 that provides role-play simulation experience. In one embodiment, the station or system 600 is implemented utilizing a general purpose computer or any other hardware equivalents. Thus, the station or system 600 comprises a processor 602, a memory 606, e.g., random access memory ("RAM") and/or read only memory (ROM), a role-play simulation engine 608, and various input/output devices 604, (e.g., audio/video outputs and audio/video inputs, storage devices, including but not limited to, a tape drive, a floppy drive, a hard disk drive or a compact disk drive, a receiver, a transmitter, a speaker, a display, an image capturing sensor, e.g., those used in a digital still camera or digital video camera, a clock, an output port, a user input device (such as a keyboard, a keypad, a mouse, and the like, or a microphone for capturing speech commands)).

It should be understood that the role-play simulation engine 608 may be implemented as one or more physical devices that are coupled to the processor 602 to provide a role-play simulation experience. For example, the role-play simulation engine 608 may include a plurality of modules. Alternatively, the role-play simulation engine 608 may be represented by one or more software applications (or even a combination of software and hardware, e.g., using application specific integrated circuits (ASIC)), where the software is loaded from a storage medium, (e.g., a magnetic or optical drive, diskette, or non-volatile memory) and operated by the processor in the memory 606 of the computer. As such, the role-play simulation engine 608 (including associated data structures) of the present disclosure may be stored on a computer readable medium, e.g., RAM memory, magnetic or optical drive or diskette and the like. The station or system 600 may be utilized to implement any of the configurations herein.

It is understood that the apparatuses, systems, computer program products, and processes described herein may also be applied in other types of apparatuses, systems, computer program products, and processes. Those skilled in the art will appreciate that the various adaptations and modifications of the embodiments of the apparatuses, systems, computer program products, and processes described herein may be configured without departing from the scope and spirit of the present apparatuses, systems, computer program products, and processes. Therefore, it is to be understood that, within the scope of the appended claims, the present apparatuses, systems, computer program products, and processes may be practiced other than as specifically described herein.

We claim:

1. A system comprising:
    a coordination processor that receives data from a role-play environment indicating a state of the role-play environment and that composes an instruction to a performer that is assigned a role in the role-play environment to perform an action in the role-play environment, wherein the instruction comprises actions that implement a narrative possibility that is selected from a plurality of pre-authored narrative possibilities for a role-play experience in the role-play environment based upon the state of the role-play environment corresponding to the narrative possibility; and
    an interface that receives the instruction from the coordination processor and provides the instruction to the performer to implement the narrative possibility in the role-play environment.

2. The system of claim 1, further comprising an authoring component that generates the plurality of pre-authored narrative possibilities.

3. The system of claim 1, wherein the coordination processor receives the data from the role-play environment through at least one sensor.

4. The system of claim 3, wherein the at least one sensor is located within a device located on a participant in the role-play environment that participates in the role-play environment without receiving an instruction to perform any action from the coordination processor.

5. The system of claim 4, wherein the at least one sensor is a tracking device.

6. The system of claim 4, wherein the at least one sensor is a Global Positioning System device.

7. The system of claim 3, wherein the at least one sensor communicates with the coordination processor via a network.

8. The system of claim 1, wherein the coordination processor receives the data from the role-play environment through the interface.

9. The system of claim 1, wherein the performer is human.

10. The system of claim 1, wherein the performer is an autonomous character.

11. The system of claim 1, wherein the performer is a three-dimensional generated character.

12. The system of claim 1, wherein the performer is a robotic character.

13. The system of claim 1, wherein the interface is an electronic communication device.

14. A computer program product comprising a computer useable storage device having a computer readable program, wherein the computer readable program when executed on a computer causes the computer to:
receive, at a coordination processor, data from a role-play environment indicating a state of the role-play environment;
compose, at the coordination processor, an instruction to a performer that is assigned a role in the role-play environment to perform an action in the role-play environment, wherein the instruction comprises actions that implement a narrative possibility that is selected from a plurality of pre-authored narrative possibilities for a role-play experience in the role-play environment based upon the state of the role-play environment corresponding to the narrative possibility; and
send the instruction to an interface that provides the instruction to the performer to implement the narrative possibility within the role-play environment.

15. The computer program product of claim 14, wherein the computer is further caused to generate the plurality of pre-authored narrative possibilities by encoding a plurality of narrative possibilities.

16. The computer program product of claim 14, wherein the data from the role-play environment is received through at least one sensor.

17. The computer program product of claim 16, wherein the at least one sensor is located within a device located on a participant in the role-play environment that participates in the role-play environment without receiving an instruction to perform any action.

18. The computer program product of claim 17, wherein the at least one sensor is a tracking device.

19. The computer program product of claim 17, wherein the at least one sensor is a Global Positioning System device.

20. The computer program product of claim 16, wherein the at least one sensor communicates with the coordination processor via a network.

21. The computer program product of claim 14, wherein the computer is further caused to receive the data from the role-play environment through the interface.

22. The computer program product of claim 14, wherein the performer is human.

23. The computer program product of claim 14, wherein the performer is an autonomous character.

24. The computer program product of claim 14, wherein the performer is a three-dimensional generated character.

25. The computer program product of claim 14, wherein the performer is a robotic character.

26. The computer program product of claim 14, wherein the interface is an electronic communication device.

27. A method comprising:
receive, at a coordination processor, data from a role-play environment indicating a state of the role-play environment;
compose, at the coordination processor, an instruction to a performer that is assigned a role in the role-play environment to perform an action in the role-play environment, wherein the instruction comprises actions that implement a narrative possibility that is selected from a plurality of pre-authored narrative possibilities for a role-play experience in the role-play environment based upon the state of the role-play environment corresponding to the narrative possibility; and
send the instruction to an interface that provides the instruction to the performer to implement the narrative possibility within the role-play environment.

28. The method of claim 27, further comprising generating the plurality of pre-authored narrative possibilities by encoding a plurality of narrative possibilities.

29. The method of claim 27, wherein the data from the role-play environment is received through at least one sensor.

30. The method of claim 29, wherein the at least one sensor is located within a device located on a participant in the role-play environment that participates in the role-play environment without receiving an instruction to perform any action from the coordination processor.

31. The method of claim 30, wherein the at least one sensor is a tracking device.

32. The method of claim 30, wherein the at least one sensor is a Global Positioning System device.

33. A system comprising:
a coordination processor that receives data from a role-play environment indicating a state of the role-play environment and that composes an instruction to a computing device to perform an action in the role-play environment, wherein the instruction comprises actions that implement a narrative possibility that is selected from a plurality of pre-authored narrative possibilities for a role-play experience in the role-play environment based upon the state of the role-play environment corresponding to the narrative possibility; and
an interface that receives the instruction from the coordination processor and provides the instruction to the computing device to implement the narrative possibility within the role-play environment.

* * * * *